United States Patent
Triebl et al.

(10) Patent No.: US 7,343,803 B2
(45) Date of Patent: Mar. 18, 2008

(54) MODULAR ULTRASONIC SENSOR

(75) Inventors: Stefan Triebl, Muhlacker (DE); Anton Lill, Lauffen (DE); Oliver Eidel, Moglingen (DE)

(73) Assignee: Valeo Schalter und Sensoren GmbH (DE)

( * ) Notice: Subject to any disclaimer, the term of this patent is extended or adjusted under 35 U.S.C. 154(b) by 0 days.

(21) Appl. No.: 11/842,896

(22) Filed: Aug. 21, 2007

(65) Prior Publication Data
US 2007/0277615 A1  Dec. 6, 2007

Related U.S. Application Data

(63) Continuation of application No. PCT/EP2005/013983, filed on Dec. 23, 2005.

(51) Int. Cl.
*G01N 29/24* (2006.01)
*G01S 15/08* (2006.01)

(52) U.S. Cl. .............. 73/632; 340/435; 340/693.9; 367/99

(58) Field of Classification Search .......... 73/632, 73/866.5; 340/435, 693.9; 367/99, 188
See application file for complete search history.

(56) References Cited

U.S. PATENT DOCUMENTS 6,532,193 B1    3/2003   Fehse et al.

2002/0190850 A1 *  12/2002  Nishimoto et al. ......... 340/435

FOREIGN PATENT DOCUMENTS

| DE | 39 39 387 A1 | 6/1991 |
|----|---|---|
| DE | 43 40 280 C2 | 8/1996 |
| DE | 296 20 422 U1 | 3/1997 |
| DE | 197 52 921 A1 | 6/1999 |
| DE | 100 18 807 A1 | 1/2001 |
| DE | 199 37 195 A1 | 2/2001 |
| DE | 101 19 910 C1 | 8/2002 |
| DE | 202 17 612 U1 | 5/2003 |
| DE | 102 01 990 A1 | 7/2003 |
| DE | 203 04 602 U1 | 7/2003 |
| DE | 102 21 303 A1 | 11/2003 |
| DE | 102 03 387 B4 | 3/2004 |
| DE | 103 61 461 A1 | 11/2005 |
| EP | 1 462 773 A2 | 9/2004 |

* cited by examiner

*Primary Examiner*—John E. Chapman
(74) *Attorney, Agent, or Firm*—Brinks Hofer Gilson & Lione

(57) ABSTRACT

The present disclosure relates to an ultrasonic sensor used, for example, in the form of an ultrasonic vehicle parking aid provided with a sensor having an ultrasonic membrane and optionally a board provided with mounted required electronics and a coupling for an electric plug-in connection which are arranged therein, wherein said coupling is placed on a separate coupling housing and the sensor housing is combinable with different coupling housings.

12 Claims, 2 Drawing Sheets

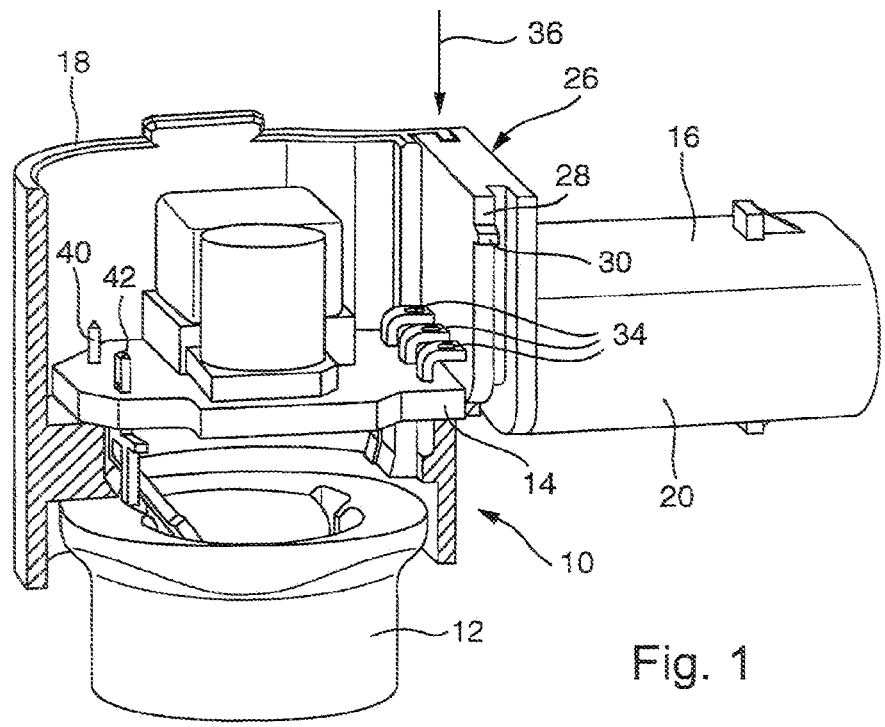
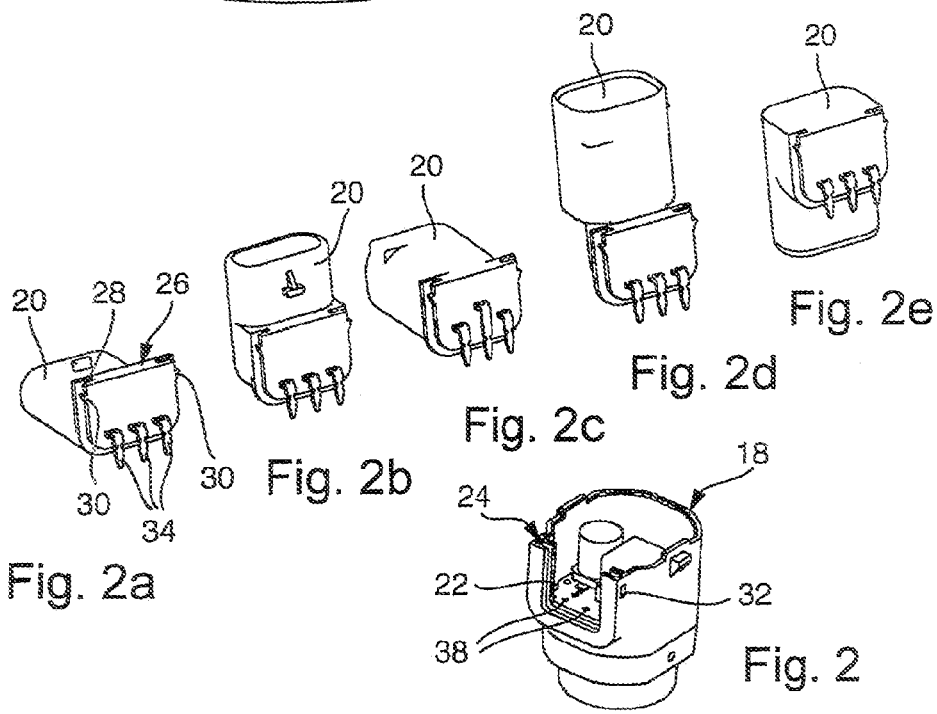

MODULAR ULTRASONIC SENSOR

CROSS-REFERENCE TO RELATED APPLICATIONS

This application is a continuation of International Application No. PCT/EP2005/013983 filed on Dec. 23, 2005, which claims the benefit of German Patent Application No. 10 2005 009 620.4, filed Feb. 23, 2005. The disclosures of the above applications are incorporated herein by reference.

FIELD

The present disclosure relates to ultrasonic sensors used, for example, as ultrasonic parking aids for motor vehicles.

BACKGROUND

The statements in this section merely provide background information related to the present disclosure and may not constitute prior art.

Ultrasonic sensors are known in numerous embodiments. They serve the purpose of assisting the driver of a motor vehicle, when parking, for example, in that they measure the distance to an obstacle. For this purpose, ultrasonic sensors possess an ultrasonic membrane, by means of which ultrasonic signals can be emitted and received in turn. This sensor is located together with a board provided with the electronics in a sensor housing, which is arranged, for example, in the bumper of a motor vehicle. The sensor housing has a coupling for an electrical connection to the feeder and data cables of the motor vehicle. Because different motor vehicles have different plugs on their feeder and data cables, the ultrasonic sensors must be provided with different housings so that they can be connected to the cables.

SUMMARY

The invention is based on reducing the complexity of different housings for different motor vehicles.

This is realized in accordance with the present disclosure by way of an ultrasonic sensor of the type cited above in that the coupling is provided on a separate coupling housing, and the sensor housing is combinable with different coupling housings.

The ultrasonic sensor of the present disclosure achieves the essential advantage of making it possible to use the same sensor housing for all types of motor vehicles, this sensor housing simply being connected to the coupling housing specific to the motor vehicle, the sensor housing and the special coupling housing then comprising the housing for the ultrasonic sensor. The same sensor housing with the same assembly can also be used for all motor-vehicle types, whereby it is necessary only to couple the coupling housing specific to the motor-vehicle type to the sensor housing before sealing, that is, before the sensor housing is sealed. The sensor housing can thus be manufactured in very large lots and therefore economically.

In a further development, it is provided that the sensor housing has an essentially casing-like housing wall, that an open-edge recess is provided in the housing wall, and that the coupling housing can be inserted into the open-edge recess. This refinement of the sensor housing enables a simple and above all mechanical connection of sensor housing and coupling housing in that the latter is inserted into the open-edge recess, thereby closing the recess. The coupling housing is therefore affixed laterally to the sensor housing, whereby the plug can project radially or axially, either above or below, depending on the type of coupling housing. The coupling can also be configured as a plug or socket.

In another variant, the edge of the recess has a U-shaped cross section, whereby the recess itself, which is open-edge, is U-shaped. The coupling housing is provided with a freely projecting flange, which can be inserted on the open-edged side into the recess and into the U-shaped cross section. The free end of the flange is encompassed by the U-shaped edge. The flange being encompassed by the U-shaped edge ensures that the coupling housing is deposed free of play in a radial direction on the sensor housing. What is more, the coupling housing is fixed in a tangential direction.

Because the flange has an outwardly protruding detent, which engages a corresponding aperture provided in the ground of the groove of the U-shaped edge when the coupling housing is completely coupled with the sensor housing, fixation in an axial direction is also achieved, i.e. extraction, or, as the case may be, detachment of the coupling housing from the sensor housing is prevented.

Electric contact takes place by way of the coupling housing having plug pins that extend in the direction of insertion, and which are pressed into the board when the coupling housing is inserted into the sensor housing. The act of pressing the pins into the board takes place at the same time as the insertion, or, as the case may be, coupling of the coupling housing with the sensor housing. It is not necessary to have special soldering of the plug pins to the board.

In contrast to conventional housings for ultrasonic sensors, the plug pins are pressed into the board from the side facing away from the ultrasonic membrane. This results in the considerable advantage that no installation space is required in order to switch the plug pins from the side of the board facing away from the ultrasonic membrane to the reverse side of the board, as is the case in conventional housings.

An additional advantage is that the installation space made available in this way can be used to arrange the EMC-sensitive components on the side of the board facing the ultrasonic membrane. The EMC-sensitive components are then flanked on one side by the ultrasonic membrane, and on the other by the board, and are then in a more protected area than they would be if arranged on the side of the board facing away from the ultrasonic membrane. A shielding cage to cover the EMC sensitive components can then be dispensed with.

Additional screening for the EMC-sensitive components can also be achieved if the sensor housing consists of an electrically conductive material, particularly plastic. This plastic can be made electrically conductive through the addition of carbon or other conductive materials, and also serves as a shielding case for EMC-sensitive components.

The coupling housing, in contrast, consists of a material that is not electrically conductive, in particular plastic in one form of the present disclosure. In that way, individual plug pins can be inserted without difficulty into the coupling housing, without the necessity of electrical insulation. The sensor housing and the coupling housing therefore comprise different materials.

The ultrasonic membrane preferably has a grounding pin and a signaling pin, whereby the grounding pin is directly braced against the sensor housing and the signaling pin is braced against the housing with electrical insulation. The bracing of the pin stabilizes it inside the housing, and the board can be fitted tightly to the pins. Soldering the pins of the ultrasonic membrane can therefore be dispensed with.

After pressing the board onto the pins of the ultrasonic membrane and after inserting the coupling housing into the sensor housing and fitting the plug pins tightly to the housing, the interior space of the sensor housing is heat-sealed and is thus hermetically sealed. The housing now features a plug specific to a certain motor vehicle.

Additional advantages, features, and details of the invention become apparent in the sub-claims and the following description, in which examples of embodiments are described with reference to the drawings. The characteristics shown in the drawings and cited in the claims and description can be employed in accordance with the teachings of the present disclosure, individually or in any combination.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the present disclosure may be well understood, there will now be described an embodiment thereof, given by way of example, reference being made to the accompanying drawing, in which:

FIG. 1 is a perspective view of an ultrasonic sensor, partially in sectional view;

FIG. 2 is a perspective view of a sensor housing, as well as various coupling housings.

DETAILED DESCRIPTION

Figure 3:
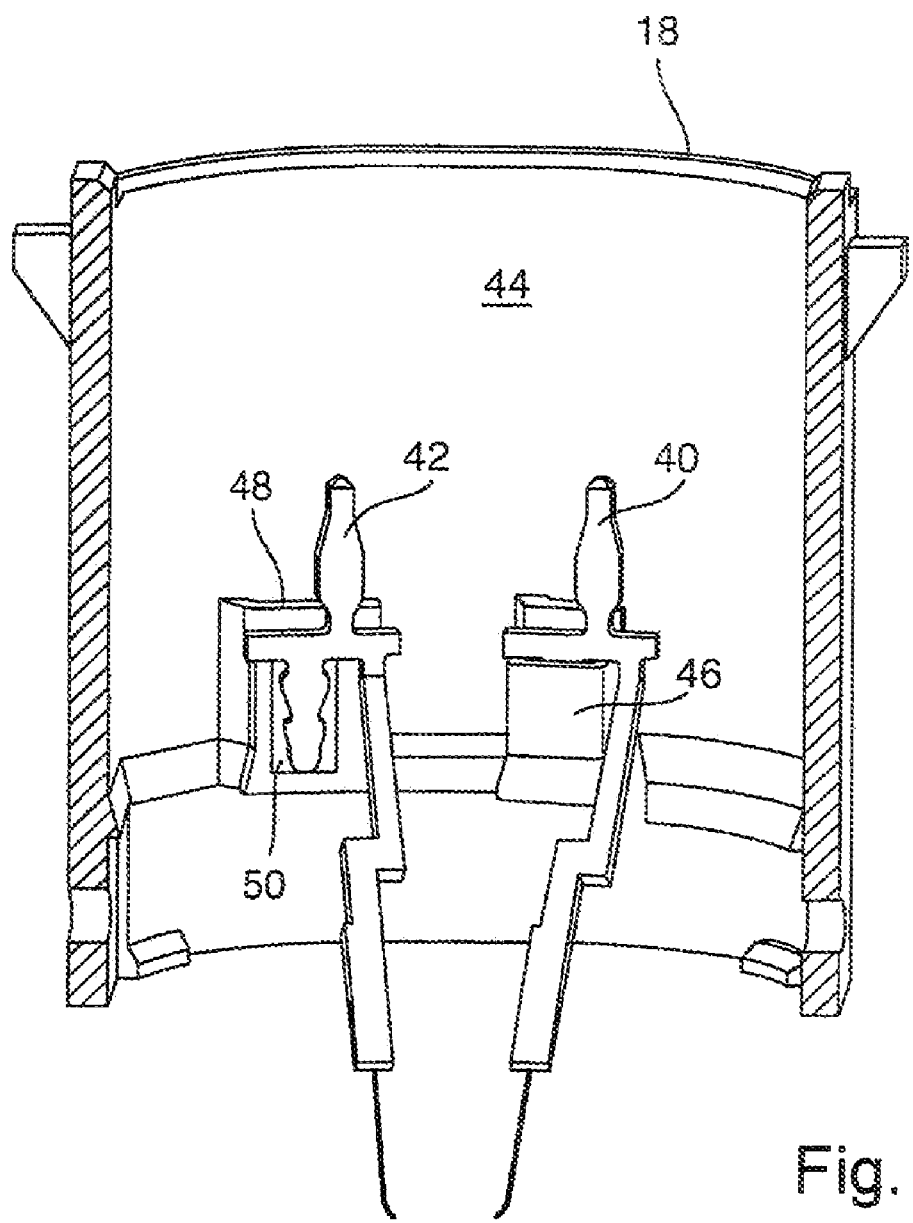
FIG. 3 is a view of the interior of the sensor housing with the pins of the ultrasonic membrane affixed to it.

The following description is merely exemplary in nature and is not intended to limit the present disclosure, application, or uses.

In FIG. 1, the reference sign 10 designates an ultrasonic sensor in which an ultrasonic membrane 12 and a board 14 are arranged, and from which a plug 16 projects. The ultrasonic sensor 10 comprises a sensor housing 18 and a coupling housing 20, which are inserted into each other. For this purpose, the sensor housing 18, as can be seen from FIG. 2, has a recess 22, whose edge 24 has a U-shaped cross section. The recess 22 is, moreover, open-edged and U-shaped.

FIG. 2 shows five variants 2a) to 2d) of coupling housings 20, whereby the variant a) is also shown in FIG. 1. The coupling housing 20 has a coupling section 26 that is provided with a nonattached circumferential flange 28, which is configured to fit the U-shaped edge 24. The flange 28 has laterally projecting detents 30 that engage detent openings 32 on the edge 24 when the coupling housing 20 is coupled to the sensor housing.

It can furthermore be seen from FIGS. 1 and 2 that plug pins 34 project from the coupling section 26 in the direction of insertion 36, whereby the board 14 arranged on the sensor housing 18 features housing openings 38 for the plug pins 34. If the coupling housing 20 is inserted into the sensor housing 18, the plug pins 34 are pushed into these housing openings 38 from above, i.e. in direction of insertion 36. Soldering is therefore no longer necessary.

In addition, it can be seen from FIG. 1, that the ultrasonic membrane 12 is connected to a grounding pin 40 and a signaling pin, which can be pressed counter to the direction of insertion 36 without soldering into the board 14. FIG. 3 shows the bracing of the grounding pin 40 and the signaling pin 42 against the internal wall of the sensor housing 18, whereby the grounding pin 40 is fitted directly into a socket, and the signal pin 42 is held by a socket 48, which has electrically insulating material 50, so that the signal pin 42 is electrically insulated against the sensor housing 18. The sensor housing 18 can therefore consist of an electrically conductive material, so that the ultrasonic membrane 12 is grounded via the grounding pin 40, and furthermore, the board 14 and the EMC-sensitive components (not shown in the drawing) intended for attachment to it on the side facing the ultrasonic membrane 12 are protected.

The sensor housing 18 can thus be provided with different coupling housings 20, whereby the interior is sealed after the coupling housing 20 has been attached to the sensor housing 18. The ultrasonic housing 10 is thus adapted to different motor vehicle types exclusively through the use of a specific coupling housing 20: the sensor housing 18 remains the same, as do all of the components inside it.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. An ultrasonic sensor comprising a sensor housing, wherein an ultrasonic generator, an ultrasonic membrane, and a coupling for an electric plug-in connection are arranged, wherein the coupling is provided at least in part on a separate coupling housing, and the sensor housing is combinable with different coupling housings and features an essentially casing-like housing, in that there is an open-edge recess in a housing wall, and in that the coupling housing can be inserted into the recess.

2. The ultrasonic sensor according to claim 1, wherein an edge of the recess features a cross section, and the coupling housing is provided with an open-ended flange, which can be inserted into the edge.

3. The ultrasonic sensor according to claim 2, wherein the flange features a projecting detent, which engages a detent opening provided in a ground of a groove of the edge when the coupling housing is fully coupled with the sensor housing.

4. The ultrasonic sensor according to claim 1, wherein the coupling housing comprises plug pins extending in the direction of insertion, which are adapted to be pressed into a board disposed within the sensor housing when the coupling housing is inserted into the sensor housing.

5. The ultrasonic sensor according to claim 4, wherein the plug pins are adapted to be pressed into the board from a side facing away from the ultrasonic membrane.

6. The ultrasonic sensor according to claim 1, wherein EMC sensitive components are arranged on a board (14) within the sensor housing and facing the ultrasonic membrane.

7. The ultrasonic sensor according to claim 1, wherein the sensor housing comprises an electrically conductive material.

8. The ultrasonic sensor according to claim 1, wherein the coupling housing comprises a non-electrically conductive material.

9. The ultrasonic sensor according to claim 1, wherein the ultrasonic membrane comprises a grounding pin and a signaling pin, and that the grounding pin is braced directly and the signaling pin is braced in an electrically insulated manner against the sensor housing.

10. The ultrasonic sensor according to claim 9, wherein the grounding pin and the signaling pin are adapted to be pressed into a board within the sensor housing and from a side facing the ultrasonic membrane.

11. The ultrasonic sensor according to claim 1, wherein an interior of the sensor housing is sealed after the coupling housing is coupled.

12. The ultrasonic sensor according to claim 1 further comprising a board having electronics disposed within the sensor housing.

* * * * *